United States Patent
Ruggeri et al.

(10) Patent No.: US 10,670,151 B2
(45) Date of Patent: Jun. 2, 2020

(54) SEGMENTED SEAL WITH SHALLOW GROOVE

(71) Applicant: Eaton Intelligent Power Limited, Dublin (IE)

(72) Inventors: Edward N. Ruggeri, Westport, MA (US); Drew Bangs, Foster, RI (US); Gerry Berard, North Providence, RI (US)

(73) Assignee: Eaton Intelligent Power Limited, Dublin (IE)

(*) Notice: Subject to any disclaimer, the term of this patent is extended or adjusted under 35 U.S.C. 154(b) by 172 days.

(21) Appl. No.: 16/062,441

(22) PCT Filed: Dec. 16, 2016

(86) PCT No.: PCT/IB2016/057731
§ 371 (c)(1),
(2) Date: Jun. 14, 2018

(87) PCT Pub. No.: WO2017/103886
PCT Pub. Date: Jun. 22, 2017

(65) Prior Publication Data
US 2018/0372225 A1 Dec. 27, 2018

Related U.S. Application Data

(60) Provisional application No. 62/268,039, filed on Dec. 16, 2015.

(51) Int. Cl.
*F16J 15/44* (2006.01)
*F16J 15/34* (2006.01)

(52) U.S. Cl.
CPC .......... *F16J 15/443* (2013.01); *F16J 15/442* (2013.01); *F16J 15/3488* (2013.01)

(58) Field of Classification Search
CPC .......... F16J 15/44; F16J 15/441; F16J 15/442; F16J 15/443
See application file for complete search history.

(56) References Cited

U.S. PATENT DOCUMENTS 3,575,424 A    4/1971   Taschenberg
4,082,296 A *   4/1978   Stein .................... F16J 15/3412
                                                          277/400

(Continued)

FOREIGN PATENT DOCUMENTS

EP        0803668 A1    10/1997
EP        1302709 A2    4/2003
WO    2012117292 A1    9/2012

OTHER PUBLICATIONS

International Search Report, PCT/IB2016/057731, dated Mar. 6, 2017.

*Primary Examiner* — Nicholas L Foster
(74) *Attorney, Agent, or Firm* — Fishman Stewart PLLC

(57) ABSTRACT

A segmented seal and segmented seal assembly (10) are disclosed. An embodiment of a radial seal assembly includes a plurality of seal segments (12) that may interconnect to form a seal ring, each seal segment having a male joint end (20) and a female joint end (30). A male joint end of one seal segment may be configured to interconnect with a female joint end of an adjacent seal segment to provide a joint interface (50). In embodiments, the male joint end may include a shallow groove or pad (40) on an inner diameter of the male joint end, and the male joint end and the female joint end may be configured to provide a seal at the joint interface. With embodiments, the female joint end may include a deep groove or pad (60) on an inner diameter of the female joint end and/or may include a vent hole (70) that is isolated from the shallow groove.

22 Claims, 2 Drawing Sheets

(56) References Cited

U.S. PATENT DOCUMENTS

| | | | |
|---|---|---|---|
| 5,509,664 A | 4/1996 | Borkiewicz | |
| 5,516,118 A * | 5/1996 | Jones | F16J 15/3488 277/400 |
| 5,558,341 A * | 9/1996 | McNickle | F16J 15/3488 277/400 |
| 6,145,843 A * | 11/2000 | Hwang | F16J 15/442 277/400 |
| 6,692,006 B2 * | 2/2004 | Holder | F16J 15/442 277/346 |
| 7,770,895 B2 * | 8/2010 | Zheng | F16J 15/442 277/416 |
| 9,638,326 B2 * | 5/2017 | Haynes | F16J 15/442 |
| 2008/0272552 A1 * | 11/2008 | Zheng | F16J 15/442 277/400 |
| 2016/0169389 A1 * | 6/2016 | Haynes | F16J 15/442 277/544 |
| 2019/0162309 A1 * | 5/2019 | McLaren | F16J 15/34 |

\* cited by examiner

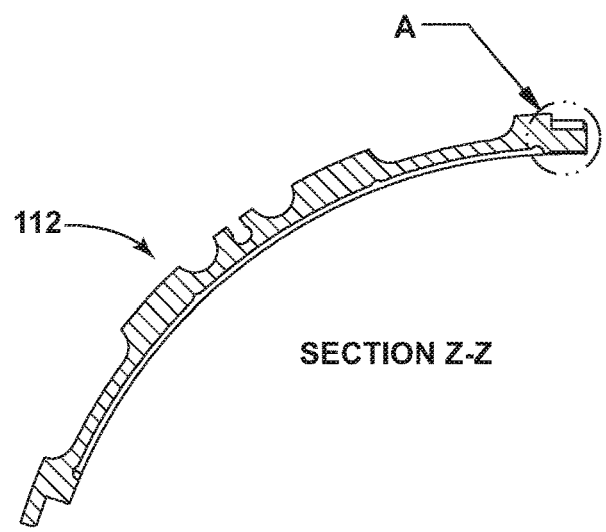
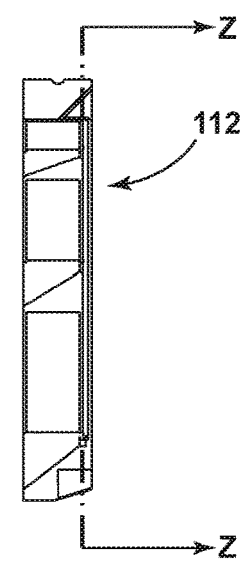
FIG. 3B          FIG. 3A
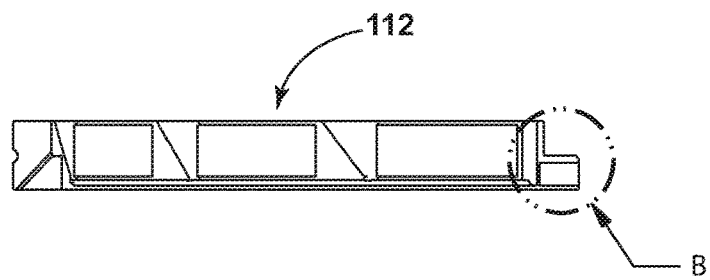
FIG. 3D
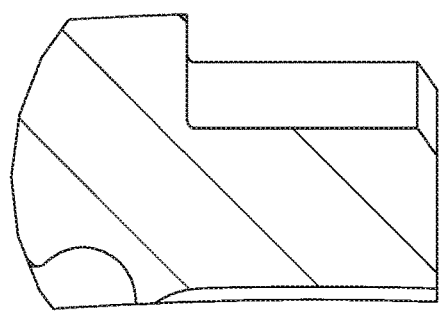
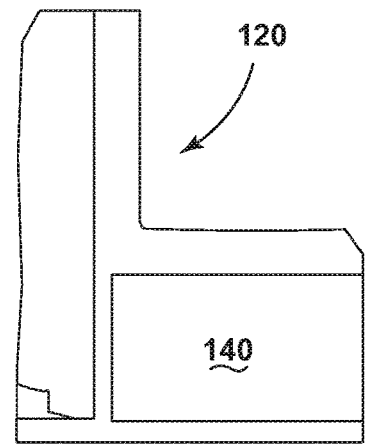
FIG. 3C          FIG. 3E

SEGMENTED SEAL WITH SHALLOW GROOVE

CROSS-REFERENCE TO RELATED APPLICATION

This application is a National Stage Patent Application of International Patent Application No. PCT/IB2016/057731 filed Dec. 16, 2016, which claims the benefit of U.S. Provisional Application Ser. No. 62/268,039, filed Dec. 16, 2015, the contents of both are incorporated by reference in their entireties.

TECHNICAL FIELD

The present disclosure relates generally to segmented seals and sealing systems, including hydrodynamic segmented seals and assemblies that are suitable for low pressure differentials and/or sub-ambient oil control. Such seals and sealing systems may, without limitation, be suitable for seal ring applications associated with rotating shafts, and for preventing liquids from leaking from a liquid side of a seal to a gas side of the seal.

BACKGROUND

Segmented seals are comprised of a plurality of individual segments that, when assembled, form a seal ring. Segmented seal rings are used in connection with contacting and hydrodynamic configurations. Such seals may provide a barrier between an air compartment and a bearing compartment that contains oil. Under certain conditions, a bearing compartment may become pressurized to a higher level than the air compartment, which may cause oil to leak from the bearing compartment into the air compartment through the segment ends of the seal. Additionally, oil may become trapped between the joints where mating segments meet. In some instances, oil impinging on a female joint end in the direction of shaft rotation may cause sufficient pressure on the segment so that the segment will lift and oil may be forced (by the rotation of the shaft) into the air compartment. It is typically undesirable for oil to leak into the air compartment, as the air compartment may be at an elevated temperature, and oil that migrates into the air compartment could burn and form coke. Coke formation on the air compartment side of the seal can, over time, result in higher oil consumptions and/or seal failure.

Among other things, it can be a challenge to provide segmented seals that are efficient and may overcome some or all of the aforementioned challenges.

SUMMARY

A segmented seal and segmented seal assembly are disclosed. An embodiment of a radial seal assembly includes a plurality of seal segments that may interconnect to form a seal ring, each seal segment having a male joint end and a female joint end. A male joint end of one seal segment may be configured to interconnect with a female joint end of an adjacent seal segment to provide a joint interface. In embodiments, the male joint end may include a shallow groove or pad on an inner diameter of the male joint end, and the male joint end and the female joint end may be configured to provide a seal at the joint interface. With embodiments, the female joint end may include a deep groove or pad on an inner diameter of the female joint end and/or may include a vent hole that is isolated from the shallow groove.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

FIG. 3A is a circumferentially-facing view of an embodiment of a seal segment looking at a male joint end that generally illustrates teachings associated with the present disclosure.

FIG. 3B is an axially-facing section view of FIG. 3A, viewed along section Z-Z.

FIG. 3C is an enlarged section view of portion "A" shown in FIG. 3B.

FIG. 3D is a view of an embodiment of a seal inner diameter of a primary sealing surface that generally illustrates teachings associated with the present disclosure.

FIG. 3E is an enlarged section view of portion "B" shown in FIG. 3D.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
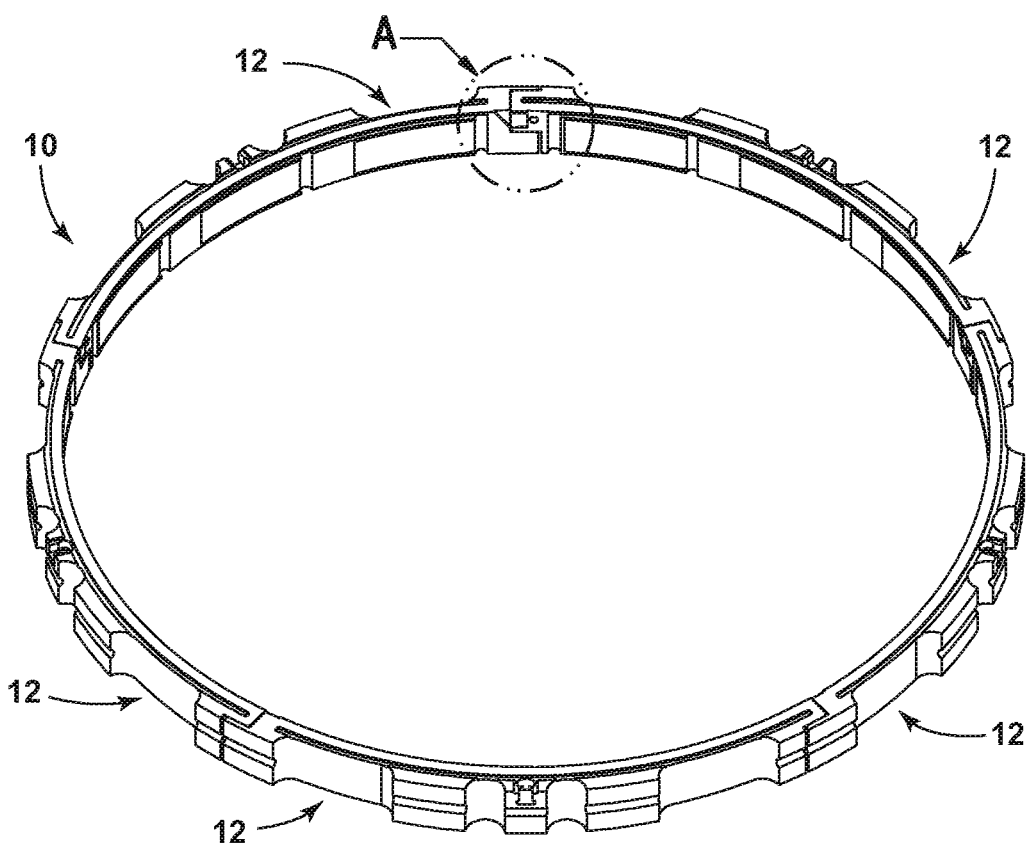
FIG. 1 is a perspective view of an embodiment of a segmented seal generally illustrating teachings associated with the present disclosure.

Referring now to FIG. 1, an embodiment of a segmented seal assembly (or seal ring) 10 that embodies aspects of the present disclosure is generally illustrated. The segmented seal assembly 10 includes a plurality of seal segments 12 that interconnect—e.g., at a plurality of joints (see, e.g., segment "A" shown in FIG. 1)—to collectively form a seal ring 10. That is, with embodiments, two or more seal segments 12 may be combined to form a seal assembly or seal ring.

Figure 2:
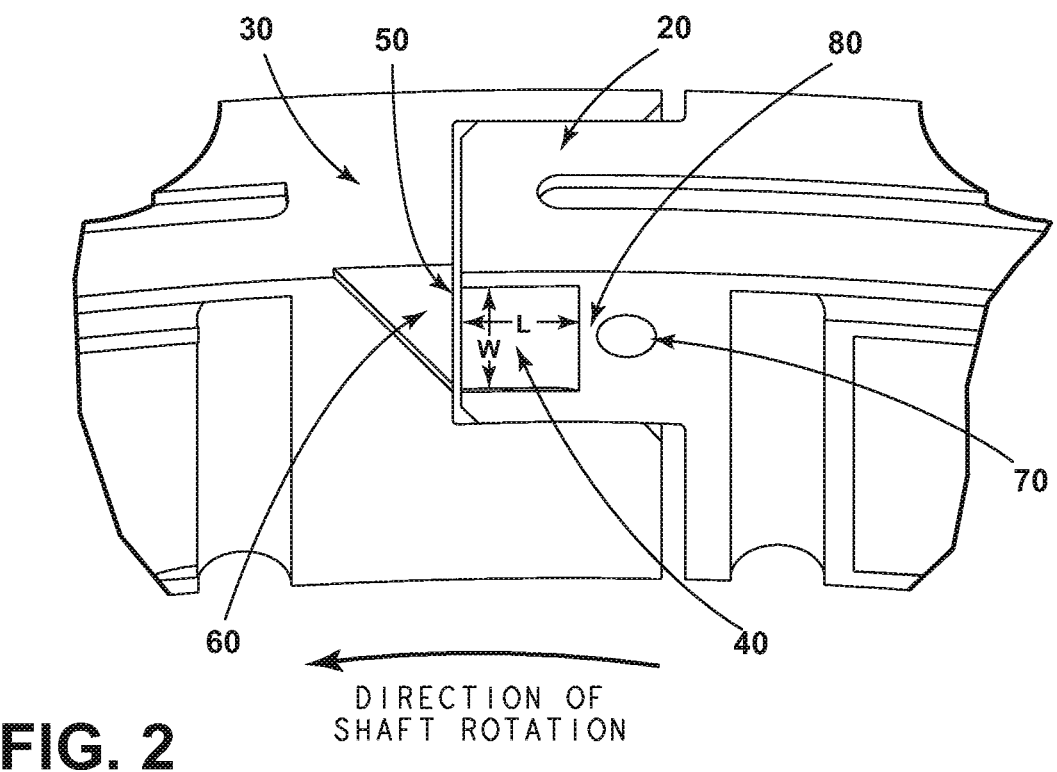
FIG. 2 is an enlarged section view of a portion of the segmented seal assembly generally illustrated in FIG. 1.

As generally illustrated in FIG. 2, each seal segment 12 may include a male joint end 20 and a female joint end 30. In embodiments, a male joint end 20 of one seal segment 12 can be configured to interconnect with or join a corresponding female joint end 30 of an adjacent seal segment 12. In embodiments, portions of a male joint end 20 and/or a female joint end 30 may be machined. As generally illustrated, a male joint end 20 and a corresponding adjacent female joint end 30 may be fitted such that the ends 20 and 30 interconnect or overlap and form a joint. With such a configuration, the male joint end 20 and a corresponding (e.g., interconnecting) female joint end 30 may interconnect or join to form a joint interface 50, and to provide a seal at a joint interface 50. Further, a male joint end 20 and a corresponding adjacent female joint end 30 may be connected or fitted together to form a seal at a joint interface 50 as well as at an inner diameter between a seal bore and a shaft or runner.

In embodiments, a male joint end 20 may include a shallow groove (or pad) 40 disposed on an inner diameter of the male joint end 20. In embodiments, such a shallow groove 20 may be machined into a surface on the inner diameter, for example, as generally illustrated in FIG. 2. In embodiments, the shallow groove 40 may have a substantially square or rectangular shape. As generally illustrated in FIG. 2, a shallow groove 40 may, for example, have an axial width (W) and a circumferential length (L). In embodiments, the circumferential length L of a shallow groove 40 may be greater than the axial width W. By way of example, and without limitation, with embodiments, axial width W of the shallow groove 40 may be less than about sixty percent (60%) of the circumferential length L of the shallow groove 40. In embodiments, the axial width W may, for example and without limitation, range from about twenty percent (20%) to about eighty percent (80%) of the total axial width of segment 12, and the circumferential length L (with or without taking into account associated curvature) may, for example and without limitation, range from about twenty percent (20%) to about eighty percent (80%) of the total circumferential length of male joint end 20. In embodiments, a shallow groove may comprise a single shallow groove, such as generally illustrated, or may comprise a plurality of adjacent shallow grooves, which may be directly connected in succession, and are formatted or configured to perform as a single groove having substantially similar dimensional characteristics to those disclosed herein.

The depth of the shallow groove (i.e., in the radial direction) may, for example and without limitation, range from about 0.0001 inches to about 0.0100 inches. Moreover, in embodiments, the depth of the shallow groove 40 may be substantially uniform across most or a majority of its radial surface area (viewed looking upwardly from the inner diameter). Although, with some embodiments, the depth of the shallow groove may vary, and even include a taper, or slight taper, in the axial and/or radial direction. With embodiments, such as generally illustrated in FIG. 2, a shallow groove 40 may be provided or disposed on a male joint end 20 of a seal bore in the direction of rotation of a shaft. The shallow groove 40 may, for example and without limitation, be machined into a portion of the male joint end 20, and may be positioned or disposed in proximity to the joint interface 50. In embodiments, such as generally illustrated, a shallow groove 40 may be configured such that it is provided in the male joint end 20 at or about the joint interface 50, but the shallow groove 40 does not circumferentially extend along the entire length of the male joint end 20 or joint interface 50.

With the inclusion of a shallow groove 40, such as in the illustrated configuration, a negative pressure (i.e., lower than system pressure) can be created at an origin or boundary of the shallow groove 40. Such a negative pressure can, among other things, serve to draw air from a hydrodynamic air film, and can direct the flow of air between the male joint end 20 and female joint end 30 to expel any oil or fluid (e.g., working fluid) that reaches or accumulates in or about a joint interface associated with the male joint end and female joint end. That is, the inclusion of a shallow groove 40 can draw air in and push it into the interface, which can serve to expel oil or fluid that may have reached or entered the interface.

As generally illustrated in FIG. 2, the female joint end 30 of a seal segment 12 may optionally include a deep groove (or deep pad) 60. The deep groove 60 may considered "deep" to the extent that the deep groove 60 may be, at least comparatively, radially deeper than the radial depth associated with the shallow groove 40. The depth of the deep groove (i.e., in the radial direction) may, for example and without limitation, range from about ten percent (10%) to about one hundred percent (100%) deeper than shallow groove 40. The inclusion of deep grooves 60 in the female joint ends 30 of an assembly 10 can, among other things, help to direct the flow of air and oil (or fluid) back to a bearing compartment. As generally illustrated, a segment or area in which oil may be expelled in connection with a deep groove 60 is generally indicated by expel segment/area 62. In embodiments, where present, a deep groove 60 may have a size and shape that is configured to permit air to flow more readily into the joint interface. For example, air may not flow as well if channeled at 90-degrees.

Additionally, as generally illustrated in FIG. 2, an optional channel or vent hole 70 may be included. In embodiments, the vent hole—which may be round, oval, or other shapes in cross section (looking upwardly from the inner diameter)—may be provided near an inlet portion or area associated with a shallow groove 40. The vent hole may be small—e.g., having an area (viewed looking upwardly from the inner diameter) that is less than twenty-five percent (25%) of the area of the shallow groove 40. In an embodiment, the vent hole is substantially circular, and has a diameter (viewed radially) that may, for example and without limitation, range from about 0.005 inches to about 0.04 inches. It is noted that the cross section or flow volume of a vent hole may be configured to be optimized for applications. Such optimization may be performed using computational methods such as, without limitation, finite element analysis (FEA), computation fluid dynamics (CFD) and/or feedback testing. Additionally, in embodiments, vent hole 70 may be provided at an angle that is perpendicular to the inner diameter, or may be provided at an angle that substantially points in the direction of shaft rotation, even if such angle is substantial.

While one vent hole is illustrated, for some embodiments, a plurality of vent holes may be provided. It is noted that a region or land portion 80 may be provided between the vent hole 70 and the shallow groove 40. Among other things, the land portion 80 may provide physical separation between the vent hole and the shallow groove, and may prevent fluid communication between the atmosphere and the system (oil or fluid) side of the seal during static conditions—e.g., when a related shaft is not rotating. That is, a land portion 80 may be configured to provide isolation for system (air-side) pressure between the vent hole and the shallow groove, as the vent hole may be physically separated/isolated from (not connected to) the shallow pad. When included as disclosed, a vent hole can provide an associated shallow groove 40 with sufficient system fluid to prevent additional accumulation of oil or operational fluid. With embodiments that include a vent hole (or plurality of vent holes), the volume flow of fluid from the vent hole 70 to the shallow groove 40 may serve, at least in part, as an accumulator for the system.

With embodiments of the seal ring 10, by configuring the seal segments 12 to maintain an air flow between the joints (male joint end and female joint end interfaces), operational fluid, such as oil, that may be associated with a bearing compartment, would not be permitted to leak into an associated air compartment.

FIGS. 3A through 3E generally illustrate views of an embodiment of a seal segment 112 embodying aspects of the present disclosure. Similar elements discussed above may be referred to with similar numbers. For example, a seal segment referenced in FIGS. 1 and 2 as element 12, may be referred to in FIGS. 3A through 3E, as element 112. Similarly, a shallow groove may be referred to in FIG. 3E as element 140.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A segmented seal assembly, comprising:
   a plurality of seal segments that interconnect to form a seal ring, each seal segment including a male joint end and a female joint end;
   wherein the male joint end of one seal segment is configured to interconnect with the female joint end of an adjacent seal segment; the male joint end includes a shallow groove or pad on an inner diameter of the male joint end; and the male joint end and the female joint end form a joint interface to provide a seal at the joint interface, and
   wherein the shallow groove or pad is confined to the male joint end, is circumferentially open in a direction facing the female joint end of the adjacent seal segment, and is not connected to any other grooves or pads on the seal segment.

2. The segmented seal assembly of claim 1, wherein the shallow groove or pad is configured to maintain an isolation of fluid communication between an air side of the assembly and an oil or fluid side of the assembly.

3. The segmented seal assembly of claim 1, wherein the shallow groove or pad is configured to be provided in a direction of rotation of a shaft.

4. The segmented seal assembly of claim 1, wherein the shallow groove or pad does not run the entire axial width of the seal segment.

5. The segmented seal assembly of claim 1, wherein the shallow groove or pad is configured to create a negative pressure at or about a boundary of the shallow groove or pad.

6. The segmented seal assembly of claim 1, wherein the shallow groove or pad is configured to draw air from a hydrodynamic air film and direct the flow of air to the joint interface of the male joint end and female joint end so as to expel any accumulated oil or fluid within the joint interface.

7. The segmented seal assembly of claim 1, wherein the shallow groove or pad is machined in the male joint end.

8. The segmented seal assembly of claim 1, wherein the shallow groove or pad has a substantially square or rectangular shape.

9. The segmented seal assembly of claim 1, wherein the shallow groove or pad has an axial width and a circumferential length, and the circumferential length is greater than the axial width.

10. The segmented seal assembly of claim 9, wherein the axial width of the shallow groove or pad is less than about sixty percent (60%) of the circumferential length of the shallow groove or pad.

11. The segmented seal assembly of claim 9, wherein the axial width ranges from about twenty percent (20%) to about eighty percent (80%) of a total axial width of the segment, and the circumferential length ranges from about twenty percent (20%) to about eighty percent (80%) of a total circumferential length of male joint end.

12. The segmented seal assembly of claim 1, wherein a depth of the shallow groove or pad in a radial direction ranges from about 0.0001 inches to about 0.0100 inches.

13. The segmented seal assembly of claim 1, wherein a depth of the shallow groove or pad is substantially uniform across most or a majority of its radial surface area, viewed looking upwardly from the inner diameter.

14. The segmented seal assembly of claim 1, including a deep groove provided in the female joint end.

15. The segmented seal assembly of claim 14, wherein the deep groove is radially deeper than a radial depth the shallow groove or pad.

16. The segmented seal assembly of claim 14, wherein a depth of the deep groove, in the radial direction, ranges from about ten percent (10%) to about one hundred percent (100%) deeper than the shallow groove or pad.

17. The segmented seal assembly of claim 14, wherein the deep groove is configured to direct a flow of air, oil, or fluid to a bearing compartment.

18. The segmented seal assembly of claim 1, including a vent hole that is open to system pressure and separated from the shallow groove or pad by a land portion.

19. The segmented seal assembly of claim 1, including a vent hole that is configured to be perpendicular or substantially perpendicular to a shaft.

20. The segmented seal assembly of claim 1, including a vent hole that is configured to be at an angle relative to a direction of rotation of a shaft, and is configured to be open to a system pressure and separated from the shallow groove or pad by a land portion.

21. The segmented seal assembly of claim 1, including a vent hole, and wherein a region or land portion is provided between the vent hole and the shallow groove or pad, and is configured to prevent fluid communication between an atmosphere and a system side during static conditions.

22. A seal segment for forming a segmented seal ring comprised of a plurality of seal segments, the seal segment comprising:
- a male joint end; and
- a female joint end provided on an opposite end of the seal segment;
- wherein the male joint end is configured to interconnect with a female joint end of an adjacent seal segment; the male joint end includes a shallow groove or pad on an inner diameter of the male joint end; the male joint end is configured to provide a seal at a joint interface with the adjacent female joint end of the adjacent seal segment; and a deep groove is provided in the female joint end, and
- wherein the shallow groove or pad is confined to the male joint end, is circumferentially open in a direction facing the female joint end of the adjacent seal segment, and is not connected to any other grooves or pads on the seal segment.

* * * * *